United States Patent
Bruce et al.

(10) Patent No.: US 7,617,297 B2
(45) Date of Patent: Nov. 10, 2009

(54) PROVIDING ARCHIVING OF INDIVIDUAL MAIL CONTENT WHILE MAINTAINING A SINGLE COPY MAIL STORE

(75) Inventors: Buford L. Bruce, Chelmsford, MA (US); Peter C. Kim, Worcester, MA (US); Michael Levi, Arlington, MA (US); Albert Silliman, Lexington, MA (US); Joseph T. Wissmann, Chelmsford, MA (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 11/189,268

(22) Filed: Jul. 26, 2005

(65) Prior Publication Data
US 2006/0020674 A1    Jan. 26, 2006

Related U.S. Application Data

(60) Provisional application No. 60/591,021, filed on Jul. 26, 2004.

(51) Int. Cl.
*G06F 15/16* (2006.01)
*G06F 12/00* (2006.01)
(52) U.S. Cl. .................. 709/217; 709/232; 707/204
(58) Field of Classification Search .............. 709/217, 709/232
See application file for complete search history.

(56) References Cited

U.S. PATENT DOCUMENTS

| 6,704,772 | B1 | 3/2004 | Ahmed et al. |
| 2002/0122543 | A1* | 9/2002 | Rowen ................ 379/93.01 |
| 2003/0208608 | A1* | 11/2003 | Merriam .............. 709/229 |
| 2004/0024810 | A1 | 2/2004 | Choubey et al. |
| 2004/0220975 | A1* | 11/2004 | Carpentier et al. .......... 707/200 |
| 2006/0010322 | A1* | 1/2006 | Novack et al. .............. 713/170 |

FOREIGN PATENT DOCUMENTS

WO    WO03001817 A2    12/2002

* cited by examiner

*Primary Examiner*—Paul H Kang
(74) *Attorney, Agent, or Firm*—Stephen T. Keohane, Esq.; Steven M. Greenberg, Esq.; Carey, Rodriguez, Greenberg & Paul, LLP

(57) ABSTRACT

A data processing system for providing archiving of individual mail content while maintaining a single copy mail store can include a mail application enabled to maintain a single copy mail store, a primary data store configured for high data throughput and acting as a single copy mail store for the mail application, and a secondary data store configured for mass storage and having a lower data throughput than the primary data store. The system further can include at least one archive implementation of an archive interface, the archive interface defining an archive task and a restore task. In one aspect of the embodiment, the system can include each of a content table, a content map table and a restore queue. Furthermore, the system can include a map view of archived content for a specified user, the map view providing a user interface for activating the restore task.

15 Claims, 2 Drawing Sheets

PROVIDING ARCHIVING OF INDIVIDUAL MAIL CONTENT WHILE MAINTAINING A SINGLE COPY MAIL STORE

CROSS-REFERENCE TO RELATED APPLICATIONS

This patent application claims the benefit under 35 U.S.C. § 119(e) of presently pending U.S. Provisional Patent Application 60/591,021, entitled PROVIDING ARCHIVING OF INDIVIDUAL MAIL CONTENT WHILE MAINTAINING A SINGLE COPY MAIL STORE, filed on Jul. 26, 2004, the entire teachings of which are incorporated herein by reference.

BACKGROUND OF THE INVENTION

1. Field of the Invention

The present invention relates to mail management in a computing system and more particularly to archiving mail content in a mail system.

2. Description of the Related Art

Electronic mail, referred to in the art as e-mail, has proven to be the most widely used computing application globally. Though e-mail has been a commercial staple for several decades, due to the explosive popularity and global connectivity of the Internet, e-mail has become the preferred mode of asynchronous communications, regardless of the geographic separation of communicating parties. Today, more e-mails are processed in a single hour than phone calls. Clearly, e-mail as an asynchronous mode of communications has been postured to replace all other modes of communications excepting voice telephony.

Like other applications, regular database backups for an e-mail system allow for restoring the database to a previous state in the event of a catastrophic failure. For very large e-mail systems, however, backup and restoration can be expensive operations both in terms of time as well as in administrative overhead. Additionally, a restore operation is known not to be an efficient means to retrieve a particular message for an individual user.

Specifically, in large e-mail systems it is common to have many messages delivered to large recipient lists. Rather than duplicate the message content for each of the recipients, many mail systems adopt a 'single copy' strategy whereby only a single copy of the message data is maintained. E-mail for each designated recipient of a message can be tracked by means of a pointer to the message rather than maintaining separate copies of the message for each designated recipient. Accordingly, backup and restore operations involve an intermediate step of reconciling message pointers.

There have been various approaches to providing a more efficient means of backing up individual user e-mail content from a single copy message store. Many approaches require backing up the e-mail content for each individual user independently rather than as part of the database backup. To do so, however, results in a second backup data store that fails to maintain the single copy model. Other problems can result as well including a potentially large increase in backup storage requirements; a significant administrative cost for generation and maintenance of these backups; and a challenge to restore the recovered e-mail into a single copy message store without creating duplicate copies of the data.

BRIEF SUMMARY OF THE INVENTION

Embodiments of the present invention address deficiencies of the art in respect to archiving mail content and provide a novel and non-obvious method, system and computer program product for archiving individual mail content while maintaining a single copy mail store. A method for providing archiving of individual mail content while maintaining a single copy mail store can include maintaining messages in a primary data store configured for high data throughput and acting as a single copy mail store for a mail application, marking selected ones of the messages in the primary data store for archiving, and moving the marked messages to a secondary data store configured for mass storage and having a lower data throughput than the primary data store. The method further can include selecting at least one of the moved, marked messages for restoration, and restoring the selected at least one of the moved, marked messages to the primary data store.

A data processing system for providing archiving of individual mail content while maintaining a single copy mail store can include a mail application enabled to maintain a single copy mail store, a primary data store configured for high data throughput and acting as a single copy mail store for the mail application, and a secondary data store configured for mass storage and having a lower data throughput than the primary data store. The system further can include at least one archive implementation of an archive interface, the archive interface defining an archive task and a restore task. In one aspect of the embodiment, the system can include each of a content table, a content map table and a restore queue. Furthermore, the system can include a map view of archived content for a specified user, the map view providing a user interface for activating the restore task.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for providing archiving of individual mail content while maintaining a single copy mail store. Specifically, atomic transient data can be stored by maintaining a single-store discipline of content storage, from incept to archive and through restoration. The single-store discipline allows system administration to balance the flow of data from primary data storage to secondary data storage which can provide a more cost efficient vehicle for bulk data storage on a long term basis.

System administration costs also can be reduced by giving the user a view of his archived data from which he can cause the selective restoration of discrete items without having to involve system administration. In this method, both ends of the process are automated. In particular, data can be archived by automated tasks based on system policies which are associated with users. Likewise, restoration can occur at the initiation of the user through automated tasks without involving system administration.

Figure 1:
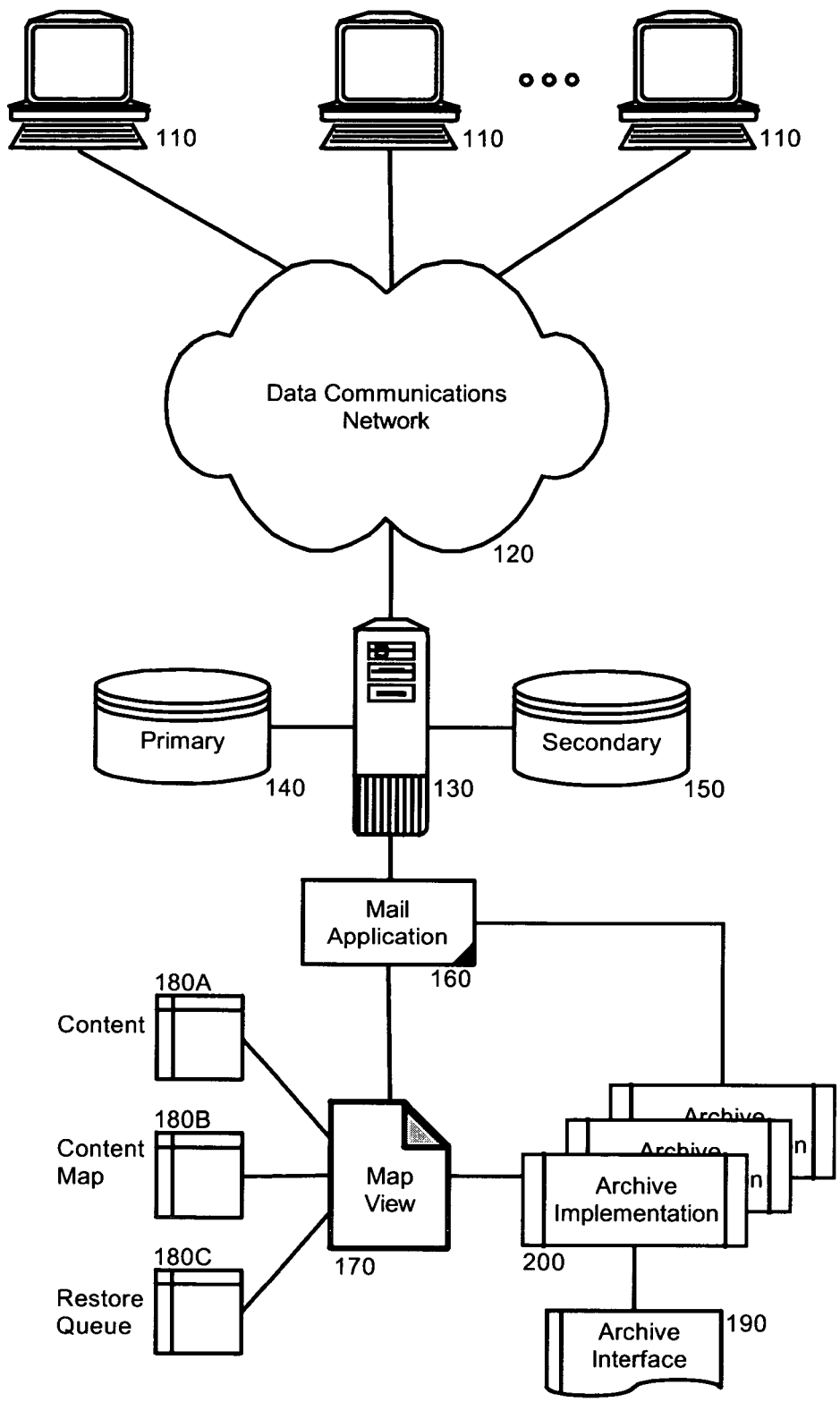
FIG. 1 is a schematic illustration of a data processing system configured for providing archiving of individual mail content while maintaining a single copy mail store; and, FIG. 2 is a flow chart illustrating a process for providing archiving of individual mail content while maintaining a single copy mail store.

In further illustration, FIG. 1 is a schematic illustration of a data processing system configured for providing archiving of individual mail content while maintaining a single copy mail store. The system can include an application host 130, such as an application server, coupled to one or more mail clients 110 over a data communications network 120. The application host 130 can support the operation of a mail application 160. The mail application can be configured to maintain a single copy mail store for storing messages designated for delivery to selected ones of the mail clients 110.

The single copy mail store can be implemented through a primary data store 140 configured for the persistence of several data tables 180A, 180B, 180C. The primary data store 140 can be characterized as having a high data throughput capability. As a data store having a high data throughput capability, the primary data store 140 further can maintain single copies of messages to support the single copy mail store model. Moreover, the primary data store can persist a message state (such as 'ARCHIVEREADY') that can be used to determine which messages are ready for archiving. The mail application 160, itself can determine when a message is to be archived.

To fulfill the archiving functionality of the single copy mail store system, a secondary data store 150 can be provided which can support the archiving of selected messages in the primary data store 140. Unlike the primary data store 140, the secondary data store 150 can be characterized as having economically feasible mass storage in lieu of high data throughput capabilities. Notably, a content table 180A can be coupled to the secondary storage 150 and can be enabled to track archived message content. To that end, the content table 180A can include several fields such as UniqueMessageID, ArchiveSystemID, UniqueArchiveID and Status. The UniqueArchiveID can be provided by the archiving logic of the mail application 160 after the content of a message has been archived.

A content map table 180B further can be provided which can be enabled to track the archived content of messages for each user whose data has been archived. The content map table 180B can include several fields such as AccountID, UniqueMessageID, CreatedDate, Status and SummaryInfo such as 'Sender', 'Received Date', 'Subject' and 'Folder'. Finally, a restore queue table 180C can be provided which can be enabled to store requests from users to restore archived content. The restore queue table 180C can include several fields such as AccountID and UniqueMessageID.

An archive view 170 of the content map table 180B can be coupled to the mail application 160. The archive view 170 can present a view of the archived content for a user and can offering the user access to a "Restore from Archive" operation. The archive view 170 further can present summary information for archived content in the secondary data store 150 in order to allow the user to identify desired content to be restored. To that end, an abstract archive interface 190 can be provided which can define the methods that are to be implemented by an archive implementation 200.

The archive implementation 200 can implement the abstract archive interface 190 and can use the secondary data store 150 for content storage. The archive implementation 200 can define an archive task which executes periodically against messages in the 'ARCHIVEREADY' state in the primary data store 140 and copies relevant information from the mail application 160 to the content map table 180B, to the secondary data store 150 and to the content table 180B. The archive interface is obtained dynamically based on the configured archive implementation. Furthermore, the configuration of the archive implementation 200 can change in between successive runs of the archive task.

The archive implementation 200 also can implement a restore task that executes periodically. The restore task can process user generated requests from the restore queue table 180C. For each message to be restored the UniqueMessageID can be extracted and used to access the content table 180A. The ArchiveSystemID from the content table 180A can be used to instantiate an archive implementation 200. The UniqueArchiveID of the archived content can then be used to recover the mail content from the secondary data store 150.

The recovered mail content subsequently can be used to re-constitute an active mail message via the message API of the mail application 160. The mail application 160 can be presented with the original UniqueMessageID and, if message is still present in the mail application 160 (another recipient of the message maintaining an active copy) then the restored mail message can be linked to the original content. In contrast, if the UniqueMessageID no longer exists in the mail application 160, the content can be created in the mail application 160.

Figure 2:
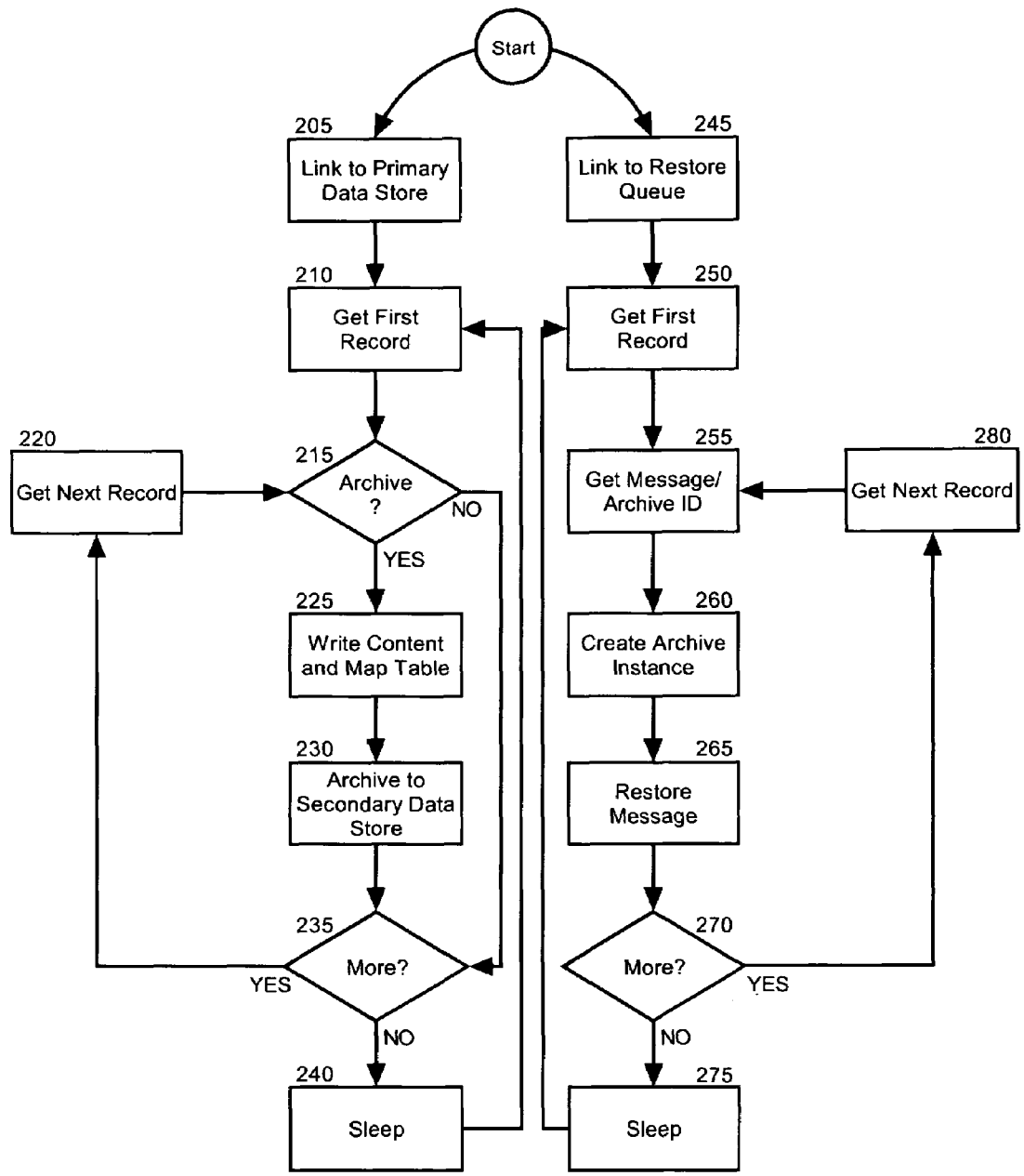

Turning now to FIG. 2, a flow chart is shown which illustrates a process for providing archiving of individual mail content while maintaining a single copy mail store. Beginning concurrently in blocks 205 and 245, communicative links can be established between the primary data store and the restore queue. In block 210, a first record in the primary data store can be inspected to determine whether the message content associated with the record is to be archived. If not, in decision block 235 if more records remain to be processed in the primary data store, in block 220 a next record can be retrieved for processing. Otherwise, the process can continue in block 225.

In block 225, information regarding the message can be written to the content table and content map table. The information to be written to the content table can include a UniqueMessageID, ArchiveSystemID, UniqueArchiveID, while the information to be written to the content map table can include AccountID, UniqueMessageID, CreatedDate, Status and SummaryInfo such as 'Sender', 'Received Date', 'Subject' and 'Folder'. Finally, in block 230, the message content can be written to the secondary data store. In decision block 235, if additional records remain to be processed the next record can be retrieved for processing in block 220. Otherwise, the process can recycle through block 240 and in block 210, the process can begin anew.

Referring next to block 245, once a communicative link has been established with the restore queue table, in block 250 a first record can be retrieved for processing. In block 255, the UniqueMessageID, ArchiveSystemID, and UniqueArchiveID can be retrieved for the record. Using this information, in block 260 an archive implementation instance of the archive interface can be created for the record and in block 265 the message can be restored from the secondary data store. Subsequently, if additional records remain to be processed in block 270, in block 280 the next record can be retrieved for processing. Otherwise, the process can recycle through block 275 and in block 250, the process can begin anew.

With the above considerations the single-copy model of the active mail system is maintained in the archive tracking system. Administrative efficiency is achieved by making the archival storage of content an integral part of system operation and by giving users the ability to restore their own data without administrative assistance.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for providing archiving of individual mail content while maintaining a single copy mail store, the method comprising:
    maintaining messages in a primary data store persisting a plurality of data tables and characterized as having a high data throughput, the primary data store acting as a single copy mail store for a mail application;
    marking selected ones of said messages in said primary data store for archiving;
    moving said marked messages from the primary data store to a secondary data store configured for mass storage and having a lower data throughput than said primary data store;
    selecting at least one of said moved, marked messages for restoration; and,
    restoring said selected at least one of said moved, marked messages from the secondary data store to said primary data store.

2. The method of claim 1, wherein said maintaining messages in a primary data store comprises populating a content table and a content map table for each message in said primary data store.

3. The method of claim 2, wherein said selecting at least one of said moved, marked messages for restoration, comprises accepting said selecting through a map view provided for said content map table.

4. The method of claim 1, wherein said marking selected ones of said messages in said primary data store for archiving, comprises writing an archive field in said primary data store for each of said selected ones of said messages.

5. The method of claim 3, wherein said selecting at least one of said moved, marked messages for restoration, comprises processing said primary data store to identify each record having a written archive field.

6. The method of claim 5, wherein said selecting at least one of said moved, marked messages for restoration, comprises writing an entry to a restore queue table for each record in said primary data store having a written archive field.

7. A data processing system for providing archiving of individual mail content while maintaining a single copy mail store, the system comprising:
    a mail application enabled to maintain a single copy mail store;
    a primary data store persisting a plurality of data tables and characterized as having a high data throughput, the primary data store acting as a single copy mail store for said mail application;
    a secondary data store configured for mass storage and having a lower data throughput than said primary data store; and,
    at least one archive implementation of an archive interface, said archive interface defining an archive task and a restore task, the archive task comprising program code enabled to mark selected messages in said primary data store for archiving and to move said marked messages to said secondary data store, said restore task comprising program code enabled to select messages in the secondary data store for restoration and to restore said selected moved, marked messages from said secondary data store to said primary data store.

8. The data processing system of claim 7, further comprising each of a content table, a content map table and a restore queue.

9. The data processing system of claim 8, further comprising a map view of archived content for a specified user, said map view providing a user interface for activating said restore task.

10. A computer program product comprising a computer readable storage medium having computer usable program code for providing archiving of individual mail content while maintaining a single copy mail store, said computer program product including:
    computer usable program code for maintaining messages in a primary data store persisting a plurality of data tables and characterized as having a high data throughput, the primary data store acting as a single copy mail store for a mail application;
    computer usable program code for marking selected ones of said messages in said primary data store for archiving;
    computer usable program code for moving said marked messages from the primary data store to a secondary data store configured for mass storage and having a lower data throughput than said primary data store;

computer usable program code for selecting at least one of said moved, marked messages for restoration; and, computer usable program code for restoring said selected at least one of said moved, marked messages from the secondary data store to said primary data store.

11. The computer program product of claim 10, wherein said computer usable program code for maintaining messages in a primary data store comprises computer usable program code for populating a content table and a content map table for each message in said primary data store.

12. The computer program product of claim 11, wherein said computer usable program code for selecting at least one of said moved, marked messages for restoration, comprises computer usable program code for accepting said selecting through a map view provided for said content map table.

13. The computer program product of claim 10, wherein said computer usable program code for marking selected ones of said messages in said primary data store for archiving, comprises computer usable program code for writing an archive field in said primary data store for each of said selected ones of said messages.

14. The computer program product of claim 13, wherein said computer usable program code for selecting at least one of said moved, marked messages for restoration, comprises computer usable program code for processing said primary data store to identify each record having a written archive field.

15. The computer program product of claim 14, wherein said computer usable program code for selecting at least one of said moved, marked messages for restoration, comprises computer usable program code for writing an entry to a restore queue table for each record in said primary data store having a written archive field.

\* \* \* \* \*